US011169963B2

(12) United States Patent
Vokaliga

(10) Patent No.: US 11,169,963 B2
(45) Date of Patent: Nov. 9, 2021

(54) MULTI-POLICY INTERLEAVED SNAPSHOT LINEAGE

(71) Applicant: EMC IP Holding Company LLC, Hopkinton, MA (US)

(72) Inventor: Deepak Vokaliga, Hopkinton, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 161 days.

(21) Appl. No.: 16/653,418

(22) Filed: Oct. 15, 2019

(65) Prior Publication Data

US 2021/0109891 A1 Apr. 15, 2021

(51) Int. Cl.
G06F 16/00 (2019.01)
G06F 16/11 (2019.01)
G06F 11/14 (2006.01)

(52) U.S. Cl.
CPC ........ *G06F 16/128* (2019.01); *G06F 11/1451* (2013.01); *G06F 16/125* (2019.01); *G06F 2201/815* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 6,745,196 B1* | 6/2004 | Colyer | ............. | G06Q 10/10 707/608 |
| 6,963,879 B2* | 11/2005 | Colyer | ............. | G06Q 10/10 |
| 7,769,722 B1* | 8/2010 | Bergant | ............. | G06F 11/2097 707/681 |
| 7,788,456 B1* | 8/2010 | Park | ............. | G06F 11/1448 711/161 |
| 10,013,214 B2* | 7/2018 | Chiu | ............. | G06F 16/00 |
| 10,326,836 B2* | 6/2019 | Chawla | ............. | G06F 3/065 |
| 10,372,683 B1* | 8/2019 | Wang | ............. | G06F 16/1752 |
| 10,534,750 B1* | 1/2020 | Sarda | ............. | G06F 16/128 |
| 10,678,481 B2* | 6/2020 | Chiu | ............. | G06F 16/00 |
| 10,986,179 B1* | 4/2021 | Chawla | ............. | H04L 67/1097 |
| 2004/0236771 A1* | 11/2004 | Colver | ............. | G06Q 10/10 |
| 2005/0182910 A1* | 8/2005 | Stager | ............. | G06F 11/1471 711/162 |
| 2017/0163728 A1* | 6/2017 | Chawla | ............. | G06F 3/0619 |
| 2017/0185511 A1* | 6/2017 | Chiu | ............. | G06F 3/0643 |
| 2018/0232153 A1* | 8/2018 | Chiu | ............. | G06F 3/0643 |

(Continued)

*Primary Examiner* — Farhan M Syed
(74) *Attorney, Agent, or Firm* — Amin, Turocy & Watson, LLP

(57) ABSTRACT

Multi-policy interleaved snapshot lineage is described herein. A method can include assigning a virtual storage volume at a remote storage system to a local storage device according to first and second data retention policies for first and second storage groups, respectively, that comprise the local storage device; obtaining a first data snapshot of the local storage device at a first time according to the first data retention policy; in response to the obtaining the first data snapshot, transferring a first incremental representation of the first data snapshot to the virtual storage volume; obtaining a second data snapshot of the local storage device at a second time according to the second data retention policy; and in response to the obtaining the second data snapshot, transferring a second incremental representation of the second data snapshot to the virtual storage volume.

20 Claims, 11 Drawing Sheets

(56) References Cited

U.S. PATENT DOCUMENTS

| | | | |
|---|---|---|---|
| 2020/0019619 A1* | 1/2020 | Sarda | G06F 3/0652 |
| 2020/0379848 A1* | 12/2020 | Ekram | G06F 11/1448 |
| 2020/0409796 A1* | 12/2020 | Terei | G06F 11/1451 |
| 2020/0409802 A1* | 12/2020 | Lim | G06F 11/1464 |
| 2020/0409909 A1* | 12/2020 | Moldvai | G06F 16/128 |

* cited by examiner

700

Cloud Provider 01

| | T1 | T2 | T3 | T4 |
|---|---|---|---|---|
|  Cloud volume A1 |  A1.1 | | |  A1.2 |
|  Cloud volume B1 |  B1.1 |  B2.1 | |  B1.2 |
|  Cloud volume C1 | |  C2.1 |  C3.1 | |
|  Cloud volume D1 | | |  D3.1 | |

US 11,169,963 B2

MULTI-POLICY INTERLEAVED SNAPSHOT LINEAGE

TECHNICAL FIELD

The subject application is related to data storage, and more particularly, to techniques for structuring and maintaining storage volumes in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way. In NAS platforms and other data storage systems, it is highly desirable to maintain copies (snapshots) of data stored on the platform for backup, archival, and/or other purposes. These data snapshots can be stored locally by the NAS platform, or alternatively data snapshots can be provided to a remote storage system (e.g., a cloud storage system) for longer-term retention.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a system is described herein. The system can include a memory that stores executable components and a processor that executes the executable components stored in the memory. The executable components can include a remote storage initiation component that assigns a virtual storage volume at a remote storage system to a storage device according to a first data retention policy for a first storage group that includes the storage device and a second data retention policy for a second storage group that includes the storage device, where the second data retention policy is distinct from the first data retention policy and the second storage group is distinct from the first storage group; a snapshotting component that generates a first data snapshot of the storage device at a first time according to the first data retention policy and a second data snapshot of the storage device at a second time according to the second data retention policy; and an incremental storage component that transfers incremental representations of the first data snapshot and the second data snapshot to the virtual storage volume.

In another aspect, a method is described herein. The method can include assigning, by a device operatively coupled to a processor, a virtual storage volume at a remote storage system to a local storage device according to a first data retention policy for a first storage group that includes the local storage device and a second data retention policy for a second storage group that includes the local storage device, where the second data retention policy is distinct from the first data retention policy and the second storage group is distinct from the first storage group; obtaining, by the device, a first data snapshot of the local storage device at a first time according to the first data retention policy; in response to the obtaining the first data snapshot, transferring, by the device, a first incremental representation of the first data snapshot to the virtual storage volume; obtaining, by the device, a second data snapshot of the local storage device at a second time according to the second data retention policy; and in response to the obtaining the second data snapshot, transferring, by the device, a second incremental representation of the second data snapshot to the virtual storage volume.

In an additional aspect, a machine-readable medium including executable instructions is described herein. The instructions, when executed by a processor of a computing system, can facilitate performance of operations including establishing a storage object at a remote storage system for a storage device according to a first data retention policy for a first storage group that includes the storage device and a second data retention policy for a second storage group that includes the storage device, where the second data retention policy is distinct from the first data retention policy and the second storage group is distinct from the first storage group; producing a first snapshot of the storage device at a first time according to the first data retention policy; in response to the producing the first snapshot, transferring a first incremental representation of the first snapshot to the storage object at the remote storage system; producing a second snapshot of the storage device at a second time according to the second data retention policy; and in response to the producing the second snapshot, transferring a second incremental representation of the second snapshot to the storage object at the remote storage system

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Figure 1:
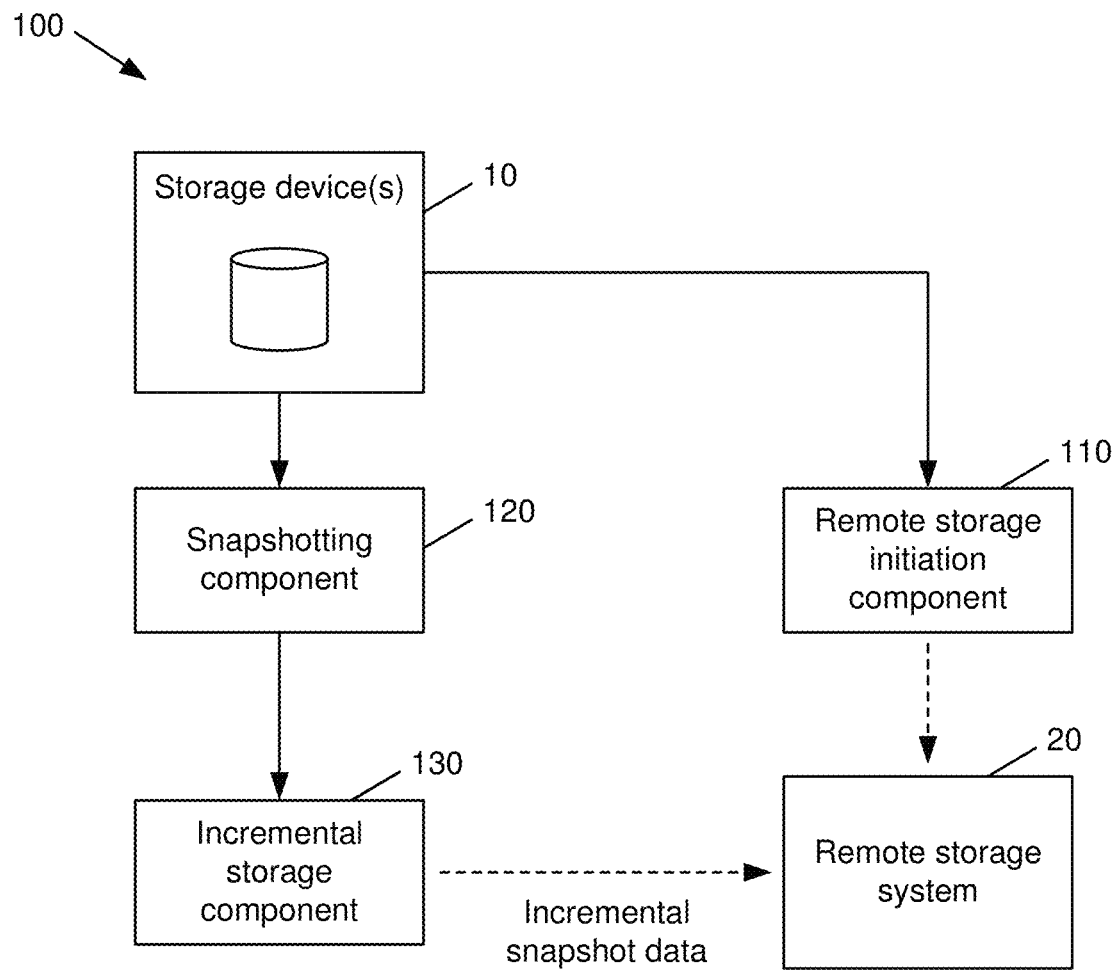
FIG. 1 is a block diagram of a system that facilitates multi-policy interleaved snapshot lineage in accordance with various aspects described herein.

With reference to the drawings, FIG. 1 illustrates a system 100 that facilitates multi-policy interleaved snapshot lineage in accordance with various aspects described herein. As shown in FIG. 1, system 100 can include one or more storage devices 10. The storage devices 10 can be physical devices (e.g., hard disk drives, solid state drives, etc.) and/or logical units (LUNs) associated with respective physical devices. In an aspect, a LUN can be structured independently of underlying physical media. For instance, a physical drive or group of drives could be logically partitioned into a group of LUNs that could be managed separately from the physical drive(s). In another example, the storage devices 10 can be collections of physical devices, e.g., multiple drives arranged as a RAID array and/or in other suitable configurations.

As further shown in FIG. 1, system 100 can also include a remote storage initiation component 110 that can assign a virtual storage volume on a remote storage system 20, such as a cloud repository or the like, to respective data retention policies associated with one or more storage devices 10. It should be appreciated that a virtual storage volume as assigned or otherwise established by the remote storage initiation component 110 in this manner need not be a physical storage device located at the remote storage system 20. Rather, the remote storage initiation component 110 can establish a virtual storage volume at the remote storage system 20 as a virtual translation layer and/or a metadata object at the remote storage system 20, which can in turn be utilized as a passthrough device by system 100.

System 100 as shown in FIG. 1 additionally includes a snapshotting component 120 that can generate data snapshots corresponding to respective ones of the storage devices 10 according to corresponding data retention policies, e.g., the data retention policies utilized by the remote storage initiation component 110 to establish storage objects for the respective storage devices 10 at the remote storage system 20. As used herein, a snapshot or data snapshot refers to a representation of the full contents of an underlying LUN or other storage device. For instance, a data snapshot can include a full copy of the stored contents of an underlying device and/or a representation of those contents, e.g., an incremental representation of the data. Techniques by which full and/or incremental data snapshots can be generated are described below.

In an aspect, a data retention policy as used by the snapshotting component 120 can specify various aspects of the snapshotting to be performed by the snapshotting component 120, e.g., snapshot generation frequency, storage devices (e.g., LUNs) designated for snapshotting, etc. In another aspect, the snapshotting component 120 can be associated with a storage array that includes the storage devices 10. Also or alternatively, the snapshotting component 120 can be implemented separately from respective storage devices 10 that are associated with the snapshotting component 120.

In a further aspect, once a data snapshot for one or more storage devices 10 has been captured, the captured data snapshot can be stored by various means. For instance, a data snapshot can be stored locally by one or more computing devices associated with system 100. Examples of techniques for storing and maintaining local snapshot data are described below with respect to FIG. 9. Also or alternatively, snapshot data can be provided to the remote storage system 20 via a cloud tethering subsystem (CTS), which can include an incremental storage component 130 as shown in FIG. 1. In an aspect, the CTS, via the incremental storage component 130 and/or independently, can perform format conversions and/or other operations to prepare a data snapshot captured by the snapshotting component 120 for communication to the remote storage system 20. For instance, the CTS can obtain data snapshots that have been obtained by the snapshotting component 120 in a block-based format and perform block-to-object translation and/or other suitable operations to convert the snapshots to an unstructured object language supported by the remote storage system 20. Also or alternatively, the CTS can perform other actions such as maintaining local records pertaining to the data snapshots located at the remote storage system 20, scheduling transfers between system 100 and the remote storage system 20, etc.

In general, snapshots captured by the snapshotting component 120 as taken on a timeline can be transferred to a heterogeneous cloud repository in object format. In an aspect, snapshot capturing and/or transferal can be performed on the bases of policies that are set on a group of LUNs and/or other storage devices 10. Such a group is referred to herein as a storage group (SG). These policies can define snapshot frequency, the retention period for respective snapshots, the cloud provider where the relevant object repository is hosted, etc. Snapshot frequency can be utilized to instruct the snapshotting component 120 to create a snapshot against respective LUNs of an SG at a regular cadence, e.g., as defined by a system administrator or other user. The set of snapshots taken against an SG in this manner are referred to herein as "snapsets." The retention period can define the age at which a snapshot is deleted locally and/or at the remote storage system 20. The cloud provider can indicate to respective elements of system 100 the object repository where the snapshots are to be shipped. Together, these and/or other parameters define a data retention and/or cloud protection policy. By way of specific, non-limiting example, a data retention policy could be as follows: Frequency=30 days, Retention=1 year, Cloud Repository=XYZ_Object_Store. This example policy indicates that a snapset is taken every 30 days and retained at the cloud provider XYZ_Object_Store for one year.

In an aspect, the snapshotting component 120 can create snapshots for respective storage devices 10, e.g., storage devices on a storage array, for a given SG according to a schedule defined by a policy, resulting in a snapset. This snapset can then be marked for shipment to the remote storage system 20. The incremental storage component 130 can then scan for and/or otherwise locate snapsets that have been marked for shipment to the remote storage system 20 and transfer incremental representations of those snapshots to the remote storage system 20, e.g., to a designated virtual storage volume or other storage object at the remote storage system 20 as assigned by the remote storage initiation component 110.

In an aspect, if a snapset processed by the incremental storage component 130 is a first snapset for a given storage device 10, e.g., no previous snapshots for the storage device 10 have been shipped to the remote storage system 20, the incremental storage component 130 can ship the snapset to the remote storage system 20 relative to an initial state of the storage object associated with the storage device 10 at the remote storage system 20. In other words, an initial snapshot for a given storage device 10 can be shipped as a substantially full snapshot, from which unallocated tracks of the storage device 10 and/or other snapshot data corresponding to portions of an underlying storage device 10 that contain no data can be omitted. Other processing steps can be performed by the incremental storage component 130 for an initial snapshot. For instance, the incremental storage component 130 can utilize differential capabilities of a storage array associated with the respective storage devices 10. As an initial step, the incremental storage component 130 can request the snapshot differential (snap-diff) bitmaps associated with a given LUN or other storage device 10. For a first snapshot associated with a storage device 10, the array can return the allocation bitmap on the snapshot, which can then be utilized to increase the efficiency of the initial snapshot.

As further shown in FIG. 1, the incremental storage component 130 can transmit further incremental snapshot data, e.g., incremental representations of additional full data snapshots, to the remote storage system 20 for subsequent snapsets associated with the storage device 10. More particularly, subsequent to an initial snapshot, subsequent snapsets for the same SG can be differential in nature compared to the previously shipped snapsets. Accordingly, when the CTS 30 requests shipment of a subsequent (Nth) snapset, the incremental storage component 130 can request the snap-diff between the Nth snapset and the (N−1)th snapset, which can in response be returned by the storage array. Using this process, the CTS 30 can be configured to read only the portions of the LUN that are set in the bitmap for shipping to the remote storage system 20 as part of the snapshot. In an aspect, the granularity of respective bits of the snap-diff bitmap can be a track that is of a uniform size (e.g., 128 kb, etc.). Accordingly, the incremental storage component 130 can perform the shipping of incremental snapshots based on the bits that are set in the bitmap.

Figure 2:
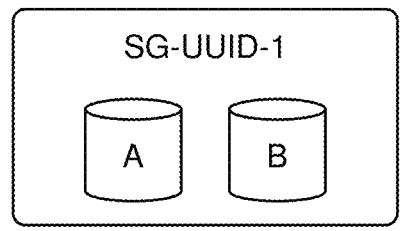
FIGS. 2-3 are diagrams depicting example snapshot lineages that can be maintained in accordance with various aspects described herein.
Figure 2:
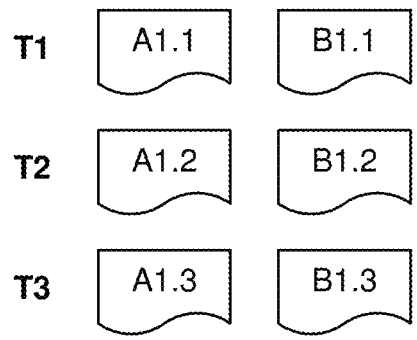
Figure 2:
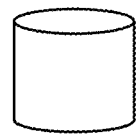
Figure 2:
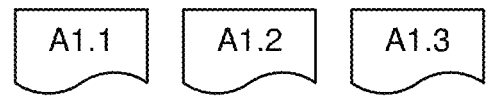
Figure 2:
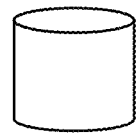
Figure 2:
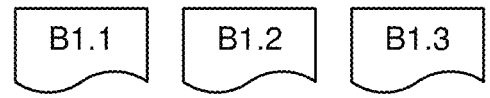

Turning now to FIG. 2, and with further reference to FIG. 1, a diagram 200 is provided that illustrates an example of a snapshot lineage for a given SG that can be maintained via the remote storage initiation component 110 and the incremental storage component 130. As used herein, a snapshot lineage refers to the group of outstanding snapshots for a storage device and/or group of storage devices in chronological order. As illustrated by diagram 200, a storage group with the identifier SG-UUID-1 contains two devices denoted A and B and is associated with a single policy to ship snapshots to Cloud Provider 01. As further shown by diagram 200, snapshots are taken for devices A and B at times T1, T2 and T3. This series can be translated into a timeline of snapshots at the device level. As the snapshots are provided to the same cloud provider, the snapshots can be provided as a single lineage.

In an aspect, since snapshots A1.1 and B1.1 shown in diagram 200 are the first snapshots for devices A and B, respectively, these snapshots can be provided as substantially full snapshots in the manner described above. As further shown in diagram 200, snapshots A1.1 and B1.1, once transferred to the cloud provider, can be associated with cloud volume A1 and cloud volume B1, respectively. As described above with respect to FIG. 1, cloud volumes A1 and B1 can be virtual cloud volumes, also referred to in the art as cloud "buckets," that facilitate access by the original storage array to data associated with respective individual storage devices at that storage array.

To improve the efficiency of subsequent snapshots, the incremental storage component 130 can track differences between snapshots A1.2 and B1.2 taken at time T2 and snapshots A1.1 and B1.1 taken at time T1 such that an incremental representation of snapshots A1.2 and B1.2, rather than the full snapshots A1.2 and B1.2, can be provided to the cloud provider. Similarly, the incremental storage component 130 can track changes from the snapshots taken at times T2 and T3 and provide an incremental representation of snapshots A1.3 and B1.3 taken at time T3 to the cloud provider.

Returning to FIG. 1, the process of shipping snapshots to a remote storage system 20, especially a remote storage system associated with a public cloud platform, can be significantly expensive due to utilization of bandwidth on the public domain to reach the cloud platform. Further, these costs can be exacerbated in many cases if the associated cloud provider facilitates dedicated fibre lines at a premium. For these reasons, it is desirable that system 100 is efficient in shipping snapshots to the remote storage system 20. However, complications can arise in maintaining a snapshot lineage in cases where a device is part of multiple SGs and has multiple snapsets belonging to different policies at a given time.

As noted above, a storage device 10 can be part of multiple SGs and/or other consistency groups. Additionally, each of these SGs can have its own cloud protection policy that defines snapshot frequency and cloud retention length. In such an environment, the snapshotting component 120 and incremental storage component 130 can facilitate creating snapshots for the device per the policies on each SG to which the device belongs. For instance, if a device belongs to two SGs, the policies on those SGs could have different snapshot frequencies, resulting in snapshots being sent to the remote storage system 20 according to both policies.

In an aspect, system 100 can improve the efficiency of transferring snapshots to the remote storage system 20 by creating a snapshot lineage for a given storage device 10 irrespective of the SGs to which that storage device 10 belongs and their associated policies. By way of example, for a storage device 10 belonging to two distinct SGs, the remote storage initiation component 110 can define a single cloud volume for the storage device 10 at the remote storage system 20 for both SGs to which the storage device belongs 10 as well as their corresponding data retention policies. Subsequently, the snapshotting component 120 can generate a first data snapshot of a storage device 10 at a first time according to a first data retention policy for the first SG as well as a second data snapshot of the storage device 10 at a second time according to a second data retention policy for the second SG. "Distinct" in this context refers to SGs having different policies and is not related to the storage devices 10 that make up the SGs. For instance, distinct SGs could have all, some, or no storage devices 10 in common provided that they operate according to different policies. In response to the snapshots being generated, the incremental storage component 130 can transfer incremental representations of the respective snapshots to the cloud volume created at the remote storage system 20 for the storage device 10.

By performing the actions described above and/or other suitable operations, system 100 can create a snapshot lineage for a storage device 10 in chronological order irrespective of the SGs associated with that storage device 10, the specific policies associated with those SGs, and/or the number of SGs associated with the storage device 10. In an aspect, the incremental storage component 130 can ship snapshots in the order presented to it, resulting in improved bandwidth efficiency by enabling differential calculations associated with the snapshots to be performed at a more granular level. When snapshot lineages are created beyond the boundaries of an SG and its associated policy, system 100 can nonetheless process the respective snapshots from a chronological sense, enabling differential data to be obtained between two snapshots at tighter intervals, resulting in a lesser change rate.

In another aspect, by associating all snapshots associated with a given storage device 10 to a single data structure at the remote storage system 20 regardless of the number of SGs associated with that device, the amount of redundant data transmitted to the remote storage system 20 that are associated with multiple SGs and/or corresponding policies to which the storage device 10 belongs can be reduced or eliminated.

Figure 3:
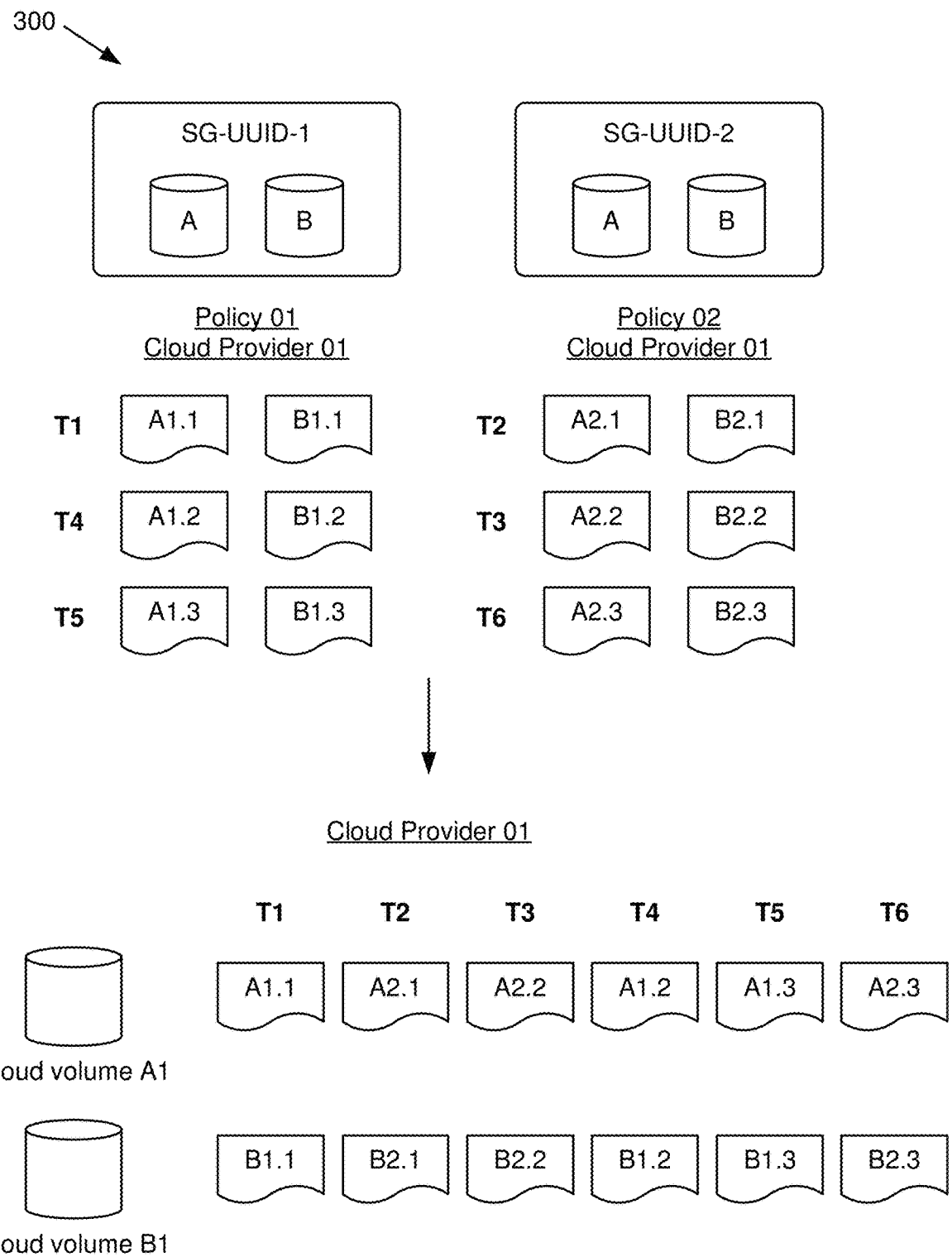

By way of example, diagram 300 in FIG. 3 illustrates a use case in which two storage devices A and B belong to two different storage groups, respectively named SG-UUID-1 and SG-UUID-2. The two storage groups contain the same storage devices but differ in the snapshot timing defined by their respective policies. As shown in diagram 300, for times T1-T6 in chronological order, storage group SG-UUID-1 takes snapshots at times T1, T4, and T5 while storage group SG-UUID-2 takes snapshots at times T2, T3, and T6. Despite the snapshots coming from different SGs with different policies, diagram 300 shows that the snapshots can result in a single lineage on the cloud volume that depends only on the timestamps at which they were taken. More particularly, at time T1, the incremental storage component 130 send snapshots A1.1 and B1.1 as full snapshots (optionally without unallocated tracks), e.g., incremental representations relative to initial states of the respective cloud volumes, to the remote storage system 20. Next, at time T2, the incremental storage component 130 can obtain snapshots A2.1 and B2.1 and process them as incremental relative to the previous snapshots taken at time T1 even though the snapshots taken at time T1 were obtained under a different policy. Similar fully incremental operations can be performed by the incremental storage component can be performed at times T3-T6, resulting in the snapshot lineages shown in the lower portion of diagram 300.

Figure 4:
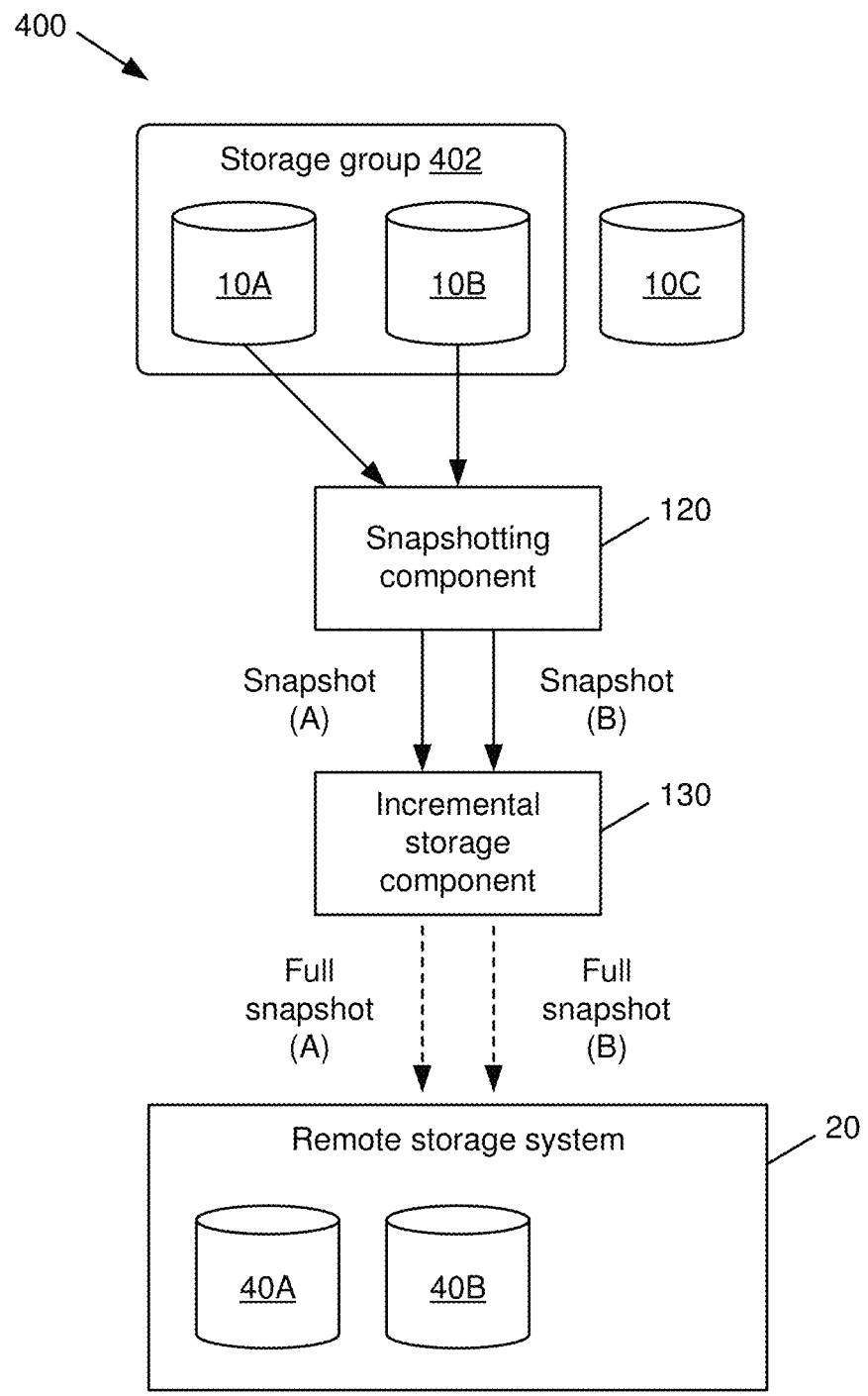
FIGS. 4-5 are respective block diagrams of a system that facilitates remote storage volume initiation and maintenance for a group of storage devices in accordance with various aspects described herein.
Figure 5:
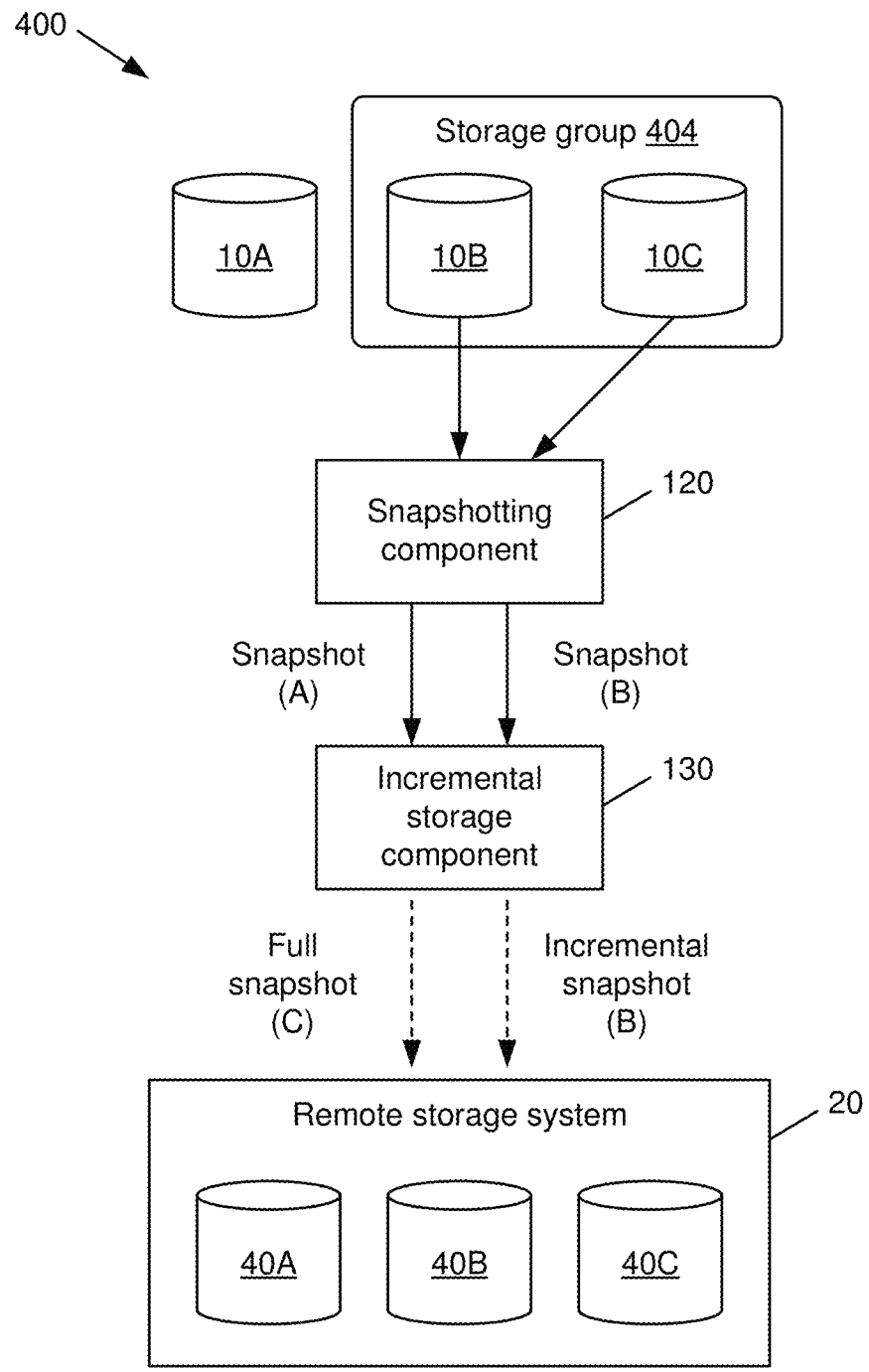

Referring now to FIGS. 4-5, respective block diagrams of a system 400 that facilitates remote storage volume initiation and maintenance for a group of storage devices 10 in accordance with various aspects described herein is illustrated. Repetitive description of like elements employed in other embodiments described herein is omitted for brevity.

In an aspect, FIGS. 4-5 depict respective operations that can be performed for an example system of three storage devices 10A, 10B, 10C that belong to respective non-overlapping SGs. With reference first to FIG. 4, the snapshotting component 120 can generate data snapshots for the storage devices 10A, 10B that belong to a first SG 402. Thus, as FIG. 4 illustrates, the snapshotting component 120 can generate a first data snapshot for storage device 10A and a second data snapshot for storage device 10B at a first time, e.g., a time T1, according to a data retention policy that is associated with SG 402. Since no previous data snapshots exist for devices 10A or 10B at the remote storage system 20 at this time, both of the data snapshots can be transferred to respective virtual storage volumes 40A and 40B at the remote storage system 20 by the incremental storage component 130 relative to an initial state of those virtual storage volumes 40A and 40B, e.g., as substantially full snapshots. While not shown in FIG. 4 for simplicity of illustration, the virtual storage volumes 40A and 40B can be created by a remote storage initiation component 120 and/or other suitable components upon establishment of the data retention policy for SG 402 and/or at another suitable time prior to snapshots being sent to the remote storage system 20.

Subsequently, as shown by FIG. 5, the snapshotting component 120 can generate snapshots for a second SG 404 that includes storage devices 10B and 10C. More particularly, the snapshotting component 120 can generate a third data snapshot of storage device 10B and a fourth data snapshot of storage device 10C at a second time, e.g., a time T2, according to a data retention policy that is associated with SG 404. Since no previous data snapshot exists for storage device 10C at the remote storage system 20 at this time, the fourth data snapshot generated for storage device 10C can be transferred to a virtual storage volume 40C at the remote storage system 20 by the incremental storage component 130 relative to an initial state of the virtual storage volume 40C, e.g., as a substantially full snapshot. Additionally, because a data snapshot was previously generated for storage device 10B for the policy associated with SG 402 as shown in FIG. 4, the third data snapshot generated for storage device 10B can be transferred by the incremental storage component 130 relative to the previous snapshot for storage device 10B without transferring the full snapshot. In a similar manner to that described above with respect to FIG. 4, it should be appreciated that the virtual storage volume 40C shown in FIG. 5 can be created by a remote storage initiation component 120 and/or other suitable components upon establishment of the data retention policy for SG 402 and/or at another suitable time prior to snapshots being sent to the remote storage system 20.

As similarly noted above with respect to FIG. 1, it should be appreciated that while the virtual storage volumes 40A-40C shown in FIGS. 4-5 can be physical storage volumes maintained by the remote storage system 20, the virtual storage volumes 40A-40C need not be physical devices and can instead be data structures and/or other logical configurations of data that are maintained by the remote storage system 20. These data structures or other logical data configurations could then subsequently be accessed by system 400 as if they were physical volumes associated with their corresponding local storage devices 10A-10C, and/or in any other suitable manner.

Figure 6:
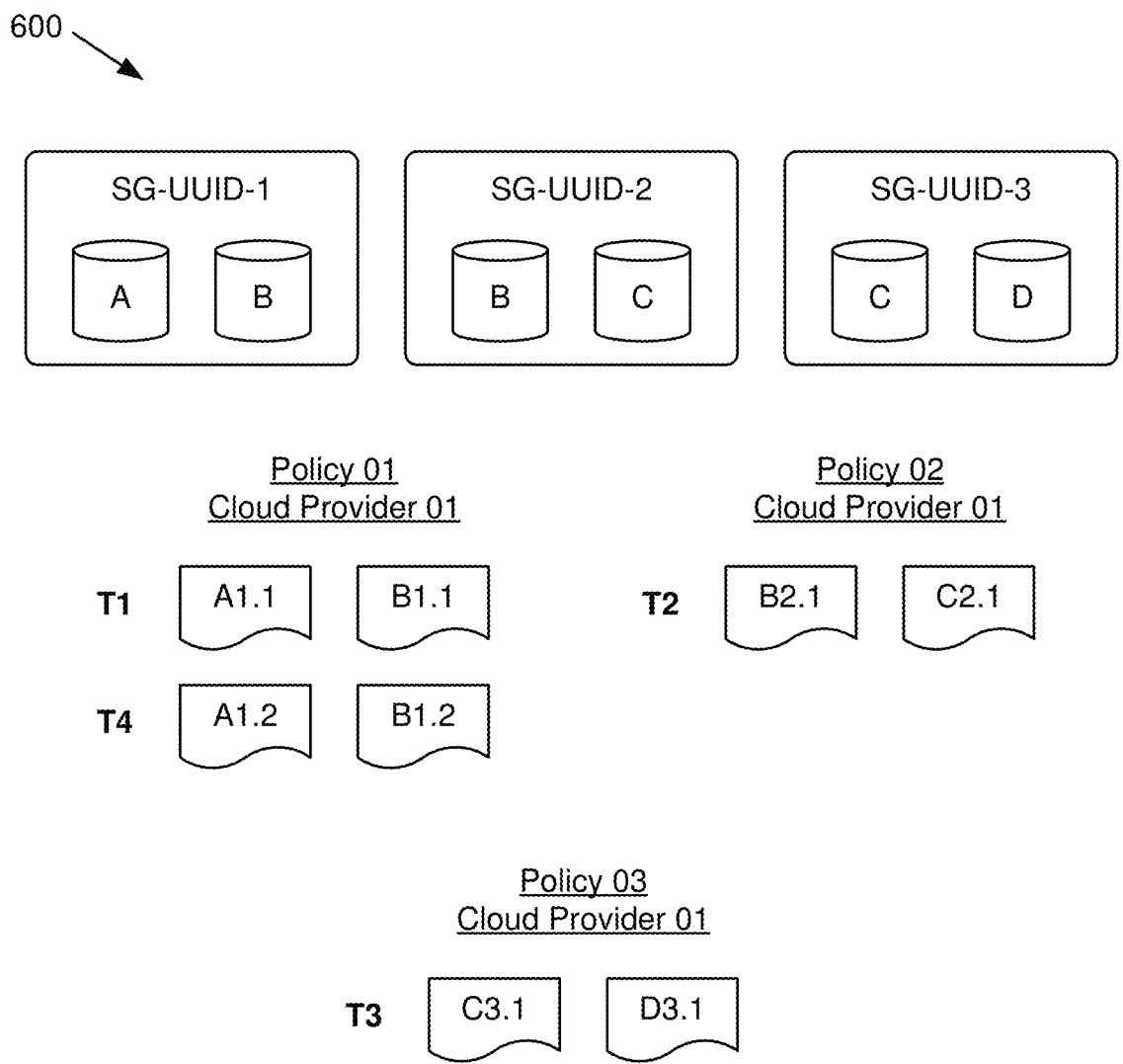
FIGS. 6-7 are diagrams depicting another example snapshot lineage that can be maintained for a set of storage groups in accordance with various aspects described herein.

Turning now to FIG. 6, and with further reference to FIG. 1, a diagram 600 that illustrates a more complex arrangement of storage devices 10 and SGs is provided. Diagram 600 illustrates an example in which three storage devices 10, denoted as A, B, C, and D, belong to partially overlapping SGs that operate according to distinct policies. As shown in diagram 600, storage devices A and B belong to SG-UUID-1, storage devices B and C belong to SG-UUID-2, and storage devices C and D belong to SG-UUID-3. Each of the SGs shown in diagram 600 have distinct policies that specify when snapshots are to be collected under the respective policies. More particularly, for times T1-T4 in chronological order, snapshots are taken for SG-UUID-1 at times T1 and T4, snapshots are taken for SG-UUID-2 at time T2, and snapshots are taken for SG-UUID-3 at time T3.

By operating in the manner described above, the incremental storage component 130 can process the snapshots at the designated times as provided in Table 1 below.

TABLE 1

Snapshot operation listing for times T1-T4.

| Time | SG ID | Snapset (SS) | Operations Performed |
| --- | --- | --- | --- |
| T1 | SG-UUID-1 (A, B) | SS 1.1 | A-Full B-Full |
| T2 | SG-UUID-2 (B, C) | SS 2.1 | B-Incremental C-Full |

TABLE 1-continued

Snapshot operation listing for times T1-T4.

| Time | SG ID | Snapset (SS) | Operations Performed |
|---|---|---|---|
| T3 | SG-UUID-3 (C, D) | SS 3.1 | C-Incremental D-Full |
| T4 | SG-UUID-1 (A, B) | SS 1.2 | A-Incremental B-Incremental |

Figure 7:
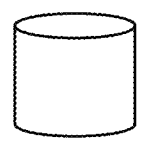
Figure 7:
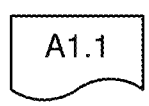
Figure 7:
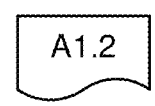
Figure 7:
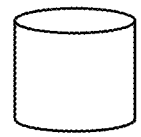
Figure 7:
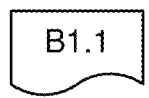
Figure 7:
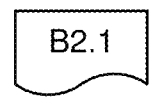
Figure 7:
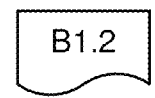
Figure 7:
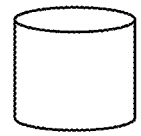
Figure 7:
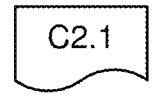
Figure 7:
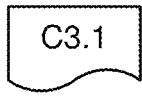
Figure 7:
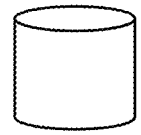
Figure 7:
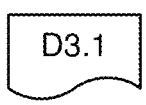

Additionally, the snapshot lineages for storage devices A-D are shown graphically by diagram 700 in FIG. 7.

Figure 8:
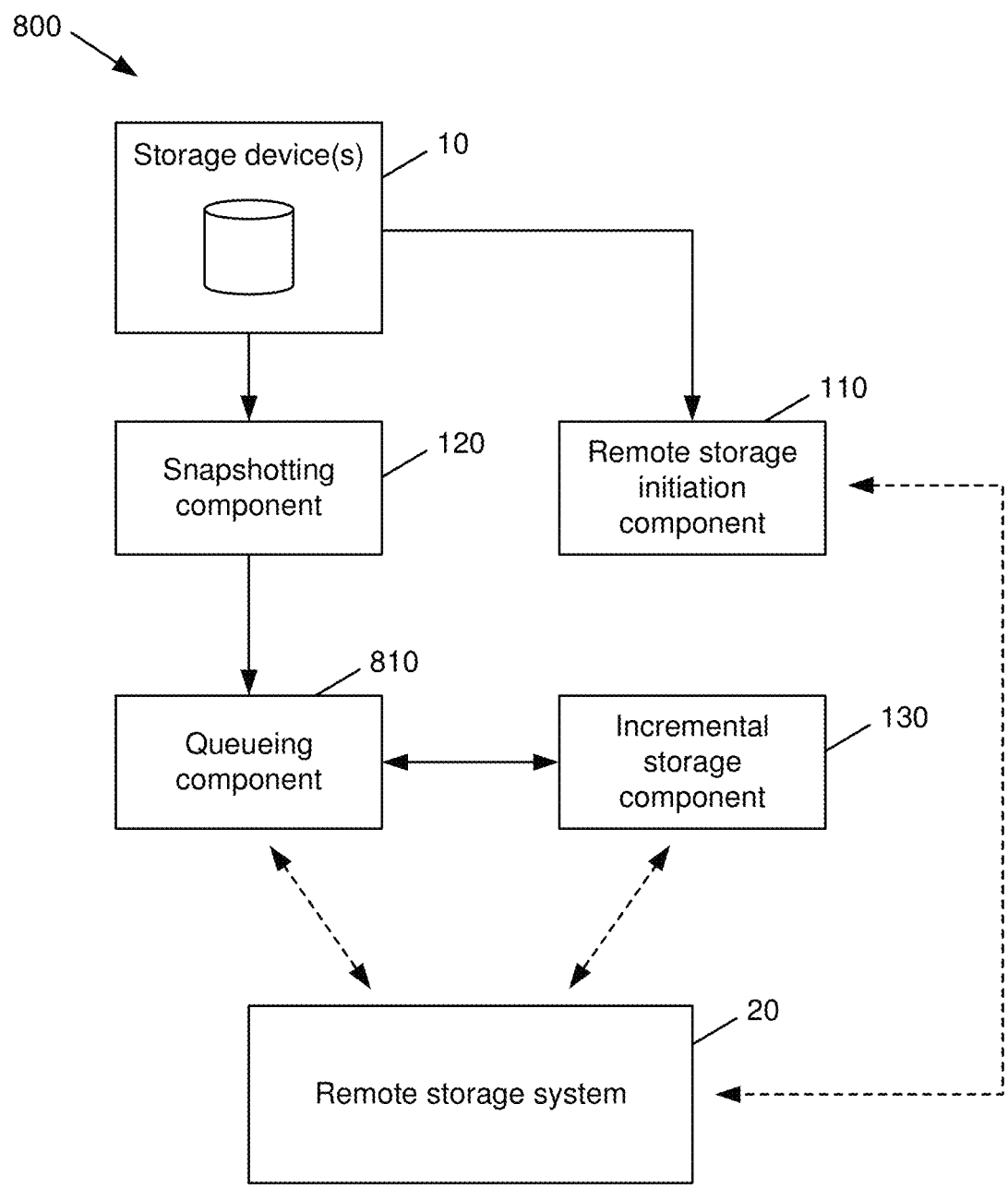
FIG. 8 is a block diagram of a system that facilitates queuing of data snapshots pending data transferal to a remote storage system in accordance with various aspects described herein.

With reference next to FIG. 8, a block diagram of a system 800 that facilitates queuing of data snapshots pending data transferal to a remote storage system 20 in accordance with various aspects described herein is illustrated. Repetitive description of like elements employed in other embodiments described herein is omitted for brevity. As shown in FIG. 8, system 800 includes a queueing component 810 that can queue respective data snapshots that have been generated by the snapshotting component 120 for one or more storage devices 10 pending transferal of the snapshots to the remote storage system 20 by the incremental storage component 130 as described above.

In an aspect, the queueing component 810 can act to queue respective data snapshots for a given storage device 10 in chronological order irrespective of the data retention policies that resulted in the generation of the respective snapshots, thereby facilitating enhanced snapshot transmission efficiency in the manner described above with respect to FIGS. 3 and 6-7.

In another aspect, the queueing component 810 can hold data snapshots generated by the snapshotting component 120 until they have been fully shipped by the incremental storage component 130. To prevent excessive snapshot backlog and mitigate local storage requirements associated with holding a large number of snapshots, the queueing component 810 can prevent the snapshotting component 120 from generating additional data snapshots for a given policy upon determining that more than a threshold number of snapshots are currently being queued for that policy. Stated another way, each policy for which snapshots are generated can be configured with a maximum queue length of N snapshots, and the snapshotting component 120 can be prevented from generating additional snapshots for a policy if N snapshots are already queued for that policy. It should be appreciated that this threshold can be uniform for all policies, or it could be set on a per-policy basis as appropriate.

Figure 9:
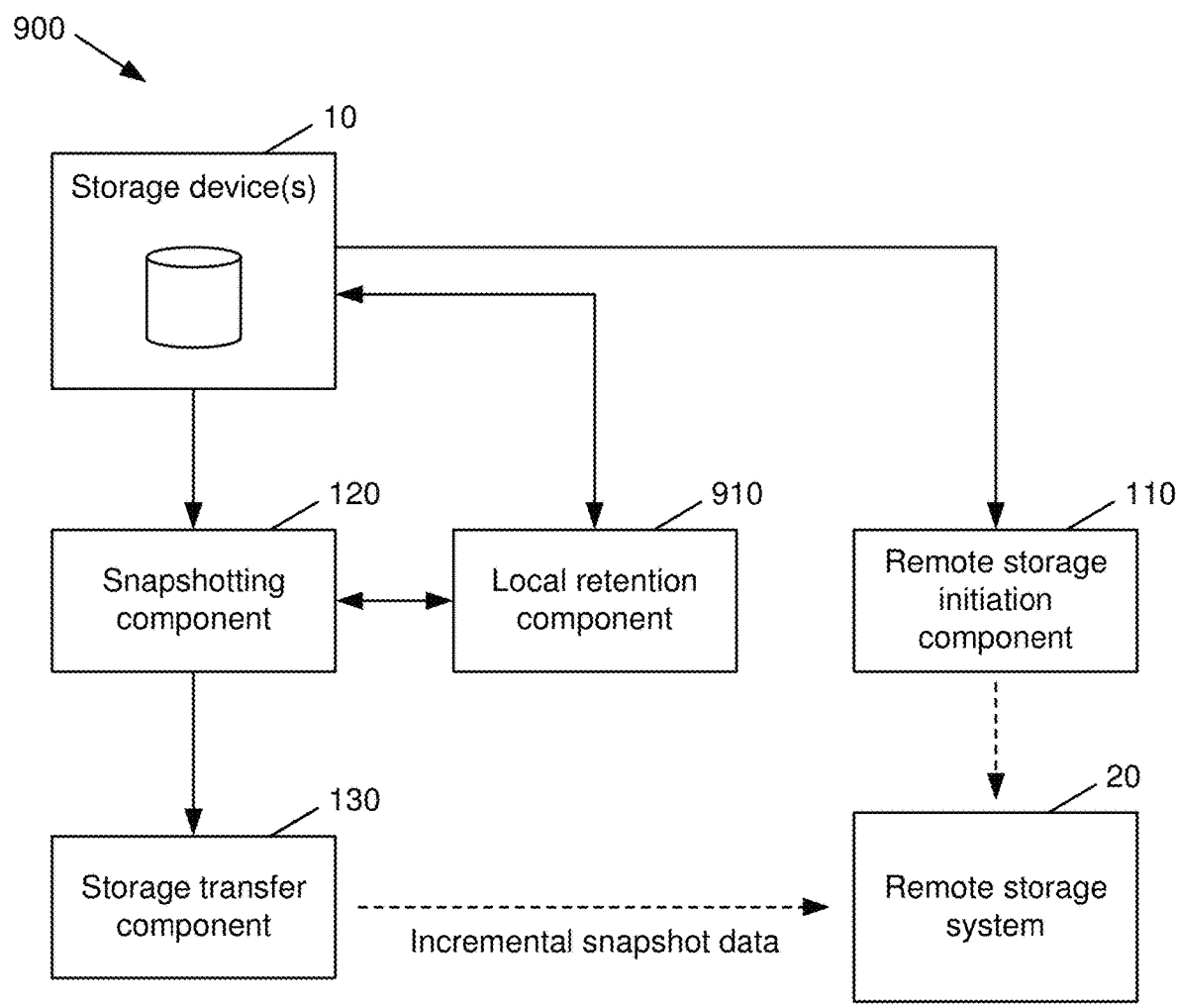
FIG. 9 is a block diagram of a system that facilitates local retention of data snapshots in accordance with various aspects described herein.

Turning now to FIG. 9, a block diagram of a system 900 that facilitates local retention of data snapshots in accordance with various aspects described herein is illustrated. Repetitive description of like elements employed in other embodiments described herein is omitted for brevity. As shown in FIG. 9, system 900 includes an incremental storage component 130 that can ship data snapshots produced by a snapshotting component 120 to a remote storage system 20 as described above with respect to FIG. 1. In addition, system 900 includes a local retention component 910 that can store respective snapshots generated by the snapshotting component 120 locally (e.g., at system 900 as opposed to the remote storage system 20) according to a retention policy for a given storage device 10, in addition to or in place of shipping the snapshot to the remote storage system 20.

In an aspect, local snapshot storage as provided by the local retention component 910 can be utilized for backup as well as other purposes. By way of example, the snapshotting component 120 can be instructed to provide snapshots for a given storage device 10 at a frequency, e.g., daily, that is higher than the rate at which snapshots are shipped to the remote storage system 20. As a result, system 900 can recover from database corruption and/or other sources of data loss with only the loss of data since the previous daily backup snapshot. These snapshots can then be discarded at a given time, e.g., once the snapshots have reached a threshold age.

In another aspect, the local retention component 910 can also be used to increase the efficiency of shipping snapshots to the remote storage system 20 by the incremental storage component 130. For example, the local retention component 910 can store a first data snapshot for a given storage device 10 in response to that snapshot being shipped to the remote storage system 20. When a subsequent snapshot is generated for the storage device 10, the incremental storage component 130 can utilize the previous snapshot as stored by the local retention component 910 to generate a differential between the current snapshot and the previous snapshot without incurring additional bandwidth for analyzing the snapshot as stored on the remote storage system 20. Once the differential has been generated and the current snapshot has been shipped incrementally to the remote storage system, the previous snapshot as stored by the local retention component 910 can be discarded and replaced with the new snapshot, and the process as described above can be repeated for another subsequent snapshot for the storage device 10.

Figure 10:
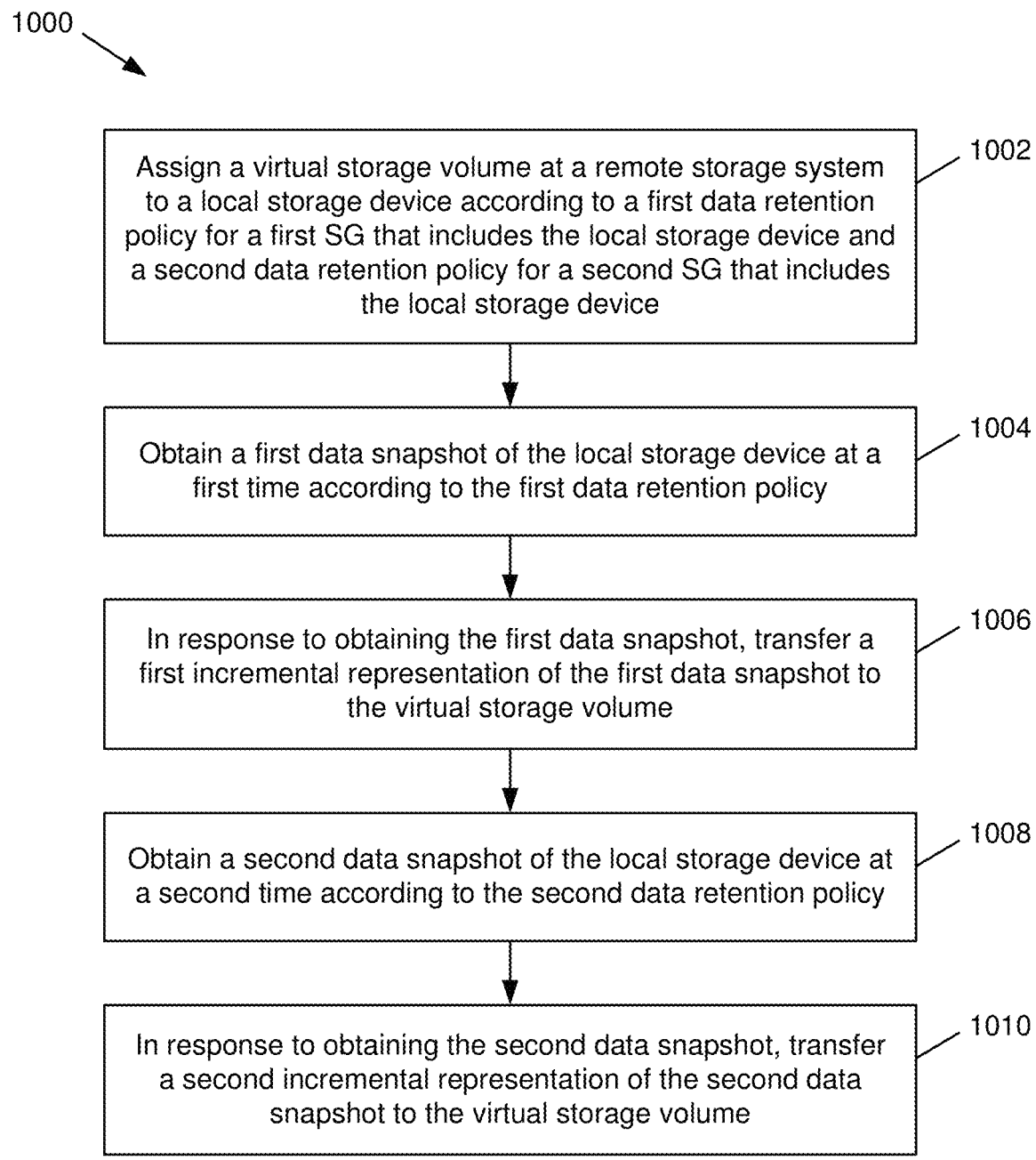
FIG. 10 is a flow diagram of a method that facilitates multi-policy interleaved snapshot lineage in accordance with various aspects described herein.

Referring next to FIG. 10, a flow diagram of a method 1000 that facilitates multi-policy interleaved snapshot lineage in accordance with various aspects described herein is illustrated. At 1002, a virtual storage volume at a remote storage system (e.g., a remote storage system 20) is assigned (e.g., by a remote storage initiation component 110) to a local storage device (e.g., a storage device 10) according to a first data retention policy for a first SG that includes the local storage device and a second data retention policy for a second SG that includes the storage device. In an aspect, the first and second SGs, as well as their corresponding data retention policies, are distinct from one another.

At 1004, a first data snapshot of the local storage device is obtained (e.g., by a snapshotting component 120) according to the first data retention policy. At 1006, in response to obtaining the first data snapshot at 1004, a first incremental representation of the first data snapshot can be transferred (e.g., by an incremental storage component 130) to the virtual storage volume.

At 1008, a second data snapshot of the local storage device is obtained (e.g., by the snapshotting component 120) according to the second data retention policy. At 1010, in response to obtaining the second data snapshot at 1008, a second incremental representation of the second data snapshot can be transferred (e.g., by the incremental storage component 130) to the virtual storage volume.

FIG. 10 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
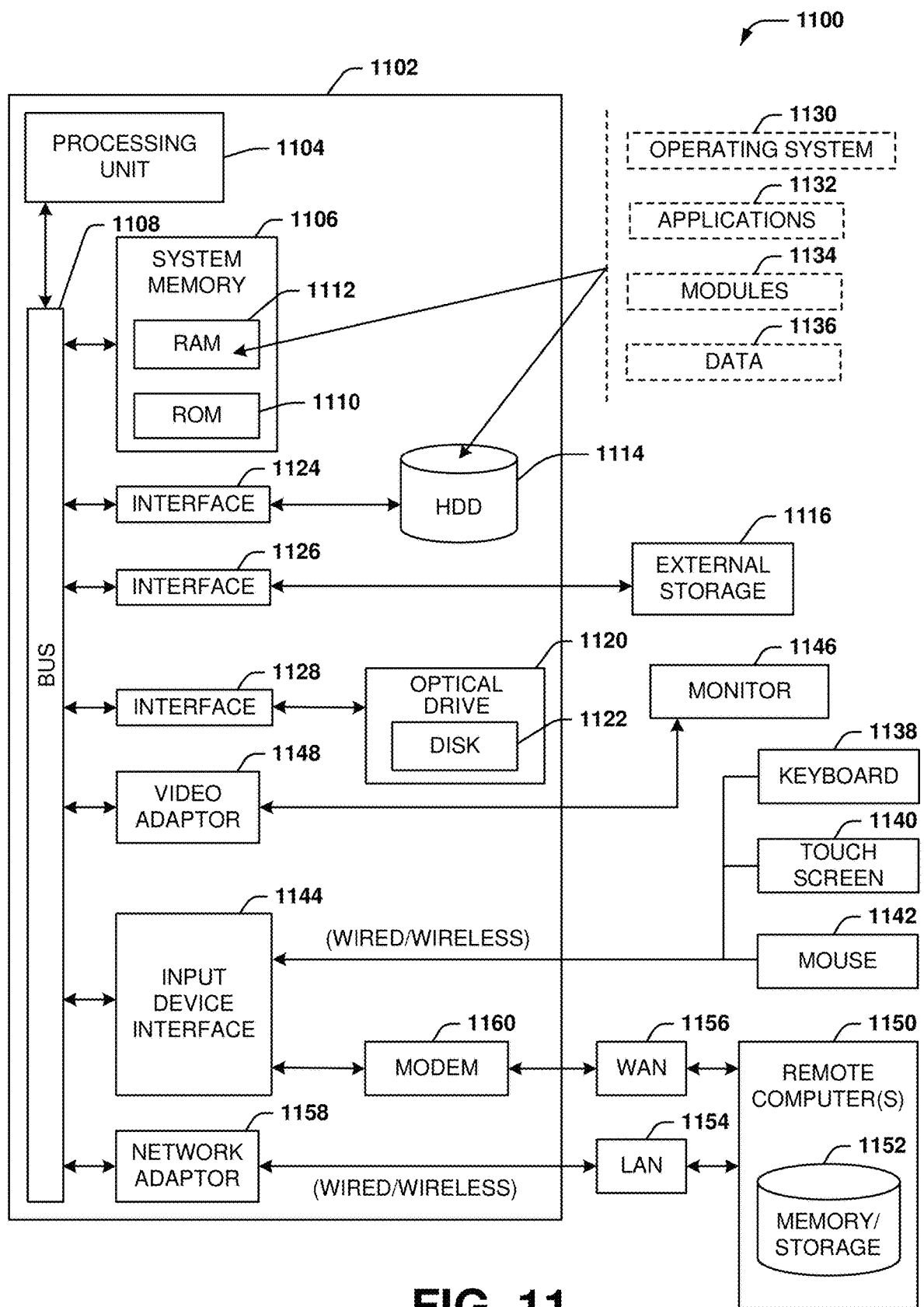
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a memory that stores executable components; and
    a processor that executes the executable components stored in the memory, wherein the executable components comprise:
        a remote storage initiation component that assigns a virtual storage volume at a remote storage system to a storage device for a first storage group that comprises the storage device according to a first data retention policy and further assigns the virtual storage volume to the storage device for a second storage group that comprises the storage device according to a second data retention policy, wherein the second data retention policy is distinct from the first data retention policy and the second storage group is distinct from the first storage group;
        a snapshotting component that generates first data snapshots of the storage device at first times according to the first data retention policy and second data snapshots of the storage device at second times according to the second data retention policy; and
        an incremental storage component that creates a common snapshot lineage of data snapshots generated for the storage device by the snapshotting component, wherein the common snapshot lineage comprises the first data snapshots and the second data snapshots, and transfers incremental representations of the first data snapshots and the second data snapshots of the common snapshot lineage to the virtual storage volume in chronological order of generation of the data snapshots of the common snapshot lineage by the snapshotting component.

2. The system of claim 1, wherein the storage device is a first storage device, wherein the first storage group comprises the first storage device and a second storage device, and wherein the second storage group comprises the first storage device and a third storage device that is distinct from the second storage device.

3. The system of claim 2, wherein the snapshotting component further generates third data snapshots of the second storage device at the first times according to the first data retention policy and fourth data snapshots of the third storage device at the second times according to the second data retention policy.

4. The system of claim 3, wherein the virtual storage volume is a first virtual storage volume, wherein the remote storage initiation component transfers the third data snapshots to the remote storage system resulting in a second virtual storage volume corresponding to the second storage device being established at the remote storage system, and wherein the remote storage initiation component further facilitates transferring the fourth data snapshots to the remote storage system resulting in a third storage volume corresponding to the third storage device being established at the remote storage system.

5. The system of claim 1, wherein the executable components further comprise:
    a queueing component that queues the data snapshots of the common snapshot lineage for transferal to the storage volume by the incremental storage component.

6. The system of claim 5, wherein the queueing component queues the data snapshots of the common snapshot lineage in the chronological order irrespective of storage groups and data retention policies associated with the data snapshots of the common snapshot lineage.

7. The system of claim 5, wherein the executable components further comprise:
a local retention component that stores a first one of the first data snapshots in response to the first one of the first data snapshots being transferred to the remote storage system, wherein the local retention component discards the first one of the first data snapshots and stores a second one of the first data snapshots in response to the second one of the first data snapshots being transferred to the remote storage system.

8. The system of claim 5, wherein the queueing component prevents the snapshotting component from generating additional ones of the first data snapshots in response to determining that a threshold number of the first data snapshots are queued by the queueing component.

9. A method, comprising:
assigning, by a device operatively coupled to a processor, a virtual storage volume at a remote storage system to a local storage device for a first storage group that comprises the local storage device according to a first data retention policy;
assigning, by the device, the virtual storage volume to the local storage device for a second storage group that comprises the local storage device according to a second data retention policy, wherein the second data retention policy is distinct from the first data retention policy and the second storage group is distinct from the first storage group;
obtaining, by the device, first data snapshots of the local storage device at first times according to the first data retention policy;
obtaining, by the device, second data snapshots of the local storage device at second times according to the second data retention policy;
creating, by the device, a common lineage of data snapshots of the local storage device as obtained via obtaining the first data snapshots and obtaining the second data snapshots; and
in response to creating the common lineage of the data snapshots, transferring, by the device, incremental representations of the first data snapshots and the second data snapshots of the common lineage to the virtual storage volume in chronological order in which the data snapshots of the common lineage were obtained.

10. The method of claim 9, wherein the local storage device is a first local storage device, wherein the first storage group comprises the first local storage device and a second local storage device, and wherein the second storage group comprises the first local storage device and a third local storage device that is distinct from the second local storage device.

11. The method of claim 10, wherein the virtual storage volume is a first virtual storage volume, and wherein the method further comprises:
assigning, by the device, a second virtual storage volume at the remote storage system to the second local storage device according to a first data retention policy;
assigning, by the device, a third virtual storage volume at the remote storage system to the third local storage device according to the second data retention policy;
obtaining, by the device, third data snapshots of the second local storage device at the first times according to the first data retention policy; and
obtaining, by the device, fourth data snapshots of the third local storage device at the second times according to the second data retention policy.

12. The method of claim 9, further comprising:
queueing, by the device, respective data snapshots of the common lineage pending transferal to the virtual storage volume.

13. The method of claim 12, wherein the queueing comprises queueing the respective data snapshots of the common lineage in the chronological order irrespective of storage groups and data retention policies associated with the respective data snapshots such that incremental representations of the respective data snapshots are transferred to the virtual storage volume in the chronological order.

14. A non-transitory machine-readable medium comprising computer executable instructions that, when executed by a processor of a computing system, facilitate performance of operations, the operations comprising:
establishing a storage object at a remote storage system for a storage device as present in a first storage group that comprises the storage device according to a first data retention policy;
assigning the storage object to the storage device as present in a second storage group that comprises the storage device according to a second data retention policy, wherein the second data retention policy is distinct from the first data retention policy and the second storage group is distinct from the first storage group;
producing first snapshots of the storage device at first times according to the first data retention policy;
producing second snapshots of the storage device at second times according to the second data retention policy;
creating a common lineage of snapshots of the storage device as produced via producing the first snapshots and producing the second snapshots; and
in response to creating the common lineage, transferring incremental representations of the first snapshots and the second snapshots to the storage object at the remote storage system in chronological order of the snapshots of the common lineage being produced.

15. The non-transitory machine-readable medium of claim 14, wherein the storage device is a first storage device, wherein the first storage group comprises the first storage device and a second storage device, and wherein the second storage group comprises the first storage device and a third storage device that is distinct from the second storage device.

16. The non-transitory machine-readable medium of claim 15, wherein the storage object is a first storage object, and wherein the operations further comprise:
establishing a second storage object corresponding to the second storage device at the remote storage system;
establishing a third storage object corresponding to the third storage device at the remote storage system;
producing third snapshots of the second storage device at the first times according to the first data retention policy; and
producing fourth snapshots of the third storage device at the second times according to the second data retention policy.

17. The non-transitory machine-readable medium of claim 14, wherein the operations further comprise:

queueing respective snapshots of the common lineage pending transferal of the respective snapshots to the remote storage system.

18. The system of claim 5, wherein the queueing component prevents the snapshotting component from generating additional ones of the first data snapshots and the second data snapshots in response to determining that a threshold number of the data snapshots of the common snapshot lineage are queued by the queueing component.

19. The method of claim 12, further comprising:
preventing, by the device, obtaining additional ones of the first data snapshots in response to determining that a threshold number of the first data snapshots are queued via the queueing.

20. The non-transitory machine-readable medium of claim 17, wherein the operations further comprise:
queueing the respective snapshots of the common lineage in the chronological order irrespective of storage groups and data retention policies associated with the respective snapshots.

* * * * *